United States Patent
Gauthier et al.

(10) Patent No.: US 8,762,263 B2
(45) Date of Patent: Jun. 24, 2014

(54) SYSTEM AND METHOD FOR SECURED ACCOUNT NUMBERS IN PROXIMITY DEVICES

(75) Inventors: Patrick Gauthier, Mountain View, CA (US); Brian Maw, Belmont, CA (US); Patrick Faith, Pleasanton, CA (US); Barbara Patterson, South San Francisco, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 2241 days.

(21) Appl. No.: 11/398,887

(22) Filed: Apr. 5, 2006

(65) Prior Publication Data

US 2007/0055630 A1 Mar. 8, 2007

Related U.S. Application Data

(60) Provisional application No. 60/714,635, filed on Sep. 6, 2005.

(51) Int. Cl.
*G06Q 40/00* (2012.01)

(52) U.S. Cl.
USPC ............................................. 705/39; 705/41

(58) Field of Classification Search
USPC .......................................................... 705/39
See application file for complete search history.

(56) References Cited

U.S. PATENT DOCUMENTS

| | | | |
|---|---|---|---|
| 3,594,727 A * | 7/1971 | Braun ........................... | 235/379 |
| 5,163,098 A | 11/1992 | Dahbura | |
| 5,877,482 A | 3/1999 | Reilly | |
| 5,988,497 A | 11/1999 | Wallace | |
| 6,076,073 A | 6/2000 | Pieterse et al. | |
| 6,163,771 A | 12/2000 | Walker et al. | |
| 6,805,288 B2 | 10/2004 | Routhenstein et al. | |
| 6,857,566 B2 | 2/2005 | Wankmueller | |
| 6,931,382 B2 * | 8/2005 | Laage et al. .................... | 705/67 |
| 7,280,975 B1 * | 10/2007 | Donner .......................... | 705/10 |
| 7,529,934 B2 | 5/2009 | Fujisawa et al. | |
| 2001/0034720 A1 * | 10/2001 | Armes ............................ | 705/65 |

(Continued)

FOREIGN PATENT DOCUMENTS

| | | |
|---|---|---|
| CN | 1549977 A | 11/2004 |
| JP | 2005-520269 A | 7/2005 |
| WO | WO 03/081832 A2 | 10/2003 |
| WO | 2004/006064 A2 | 1/2004 |

OTHER PUBLICATIONS

Katzin Edward, Hua Julian; Universal Electronic Payment Apparatuses, Methods and Systems; Sep. 27, 2011; WIPO/Thomson; 6/3K/3 (Item 1 from file:349).*

(Continued)

*Primary Examiner* — Ella Colbert
*Assistant Examiner* — Michael Cranford
(74) *Attorney, Agent, or Firm* — Kilpatrick Townsend Stockton LLP

(57) ABSTRACT

A method and system for using a secured account number for processing proximity types of wireless financial transactions associated with portable consumer proximity devices is disclosed. In one embodiment, the method includes receiving a proximity type of wireless financial transaction request along with a secured account number from a portable proximity consumer device such as a contactless smart card, converting the secured account number to the user's real account number, and transmitting the financial transaction request along with the user's real account number to the issuer of the user's real account number for authorization and processing.

16 Claims, 4 Drawing Sheets

(56) References Cited

U.S. PATENT DOCUMENTS

| | | | |
|---|---|---|---|
| 2002/0062249 A1* | 5/2002 | Iannacci | 705/14 |
| 2003/0101134 A1* | 5/2003 | Liu et al. | 705/39 |
| 2003/0208767 A1 | 11/2003 | Williamson et al. | |
| 2003/0220876 A1 | 11/2003 | Burger et al. | |
| 2004/0068472 A1* | 4/2004 | Sahota et al. | 705/64 |
| 2004/0139044 A1* | 7/2004 | Rehwald | 707/1 |
| 2005/0033686 A1 | 2/2005 | Peart et al. | |
| 2005/0038736 A1 | 2/2005 | Saunders | |
| 2005/0119978 A1* | 6/2005 | Ates | 705/67 |
| 2005/0127164 A1 | 6/2005 | Wankmueller | |
| 2005/0177496 A1* | 8/2005 | Blagg et al. | 705/39 |

OTHER PUBLICATIONS

Kumnick Phillip Lyle; Merchant-Consumer Bridging Platform Apparatuses, Methods and System; Feb. 5, 2011; WIPO/Thomson; 6/3K/4 (Item 2 from file:349).*

Reed Judson; Encryption Switch Processing; Nov. 5, 2009; WIPO/Thompson; 6/3K/5 (Item 3 from file:349).*

Speed Pass website info: http://speedpass.com/faqs/category.jsp?categoryID=3.

Speed Pass website info: http://speedpass.com/how/technology.jsp.

Speed Pass website info: http://speedpass.com/how/index.jsp.

Search/Examination Report dated Sep. 13, 2010 from Chinese Patent Application No. 200680041246.7, 18 pages.

The Japanese Office Action mailed on Feb. 13, 2012, for Japanese Patent Application No. 2008-530147, with an English Translation, 10 pages.

Search/Examination Report dated Aug. 31, 2010 from Russian Federation Patent Application No. 2008113214, 10 pages.

Canadian Office Action mailed Jan. 10, 2013 for Canadian Patent Application No. 2,621,358, 2 page.

Chinese Office Action mailed Jan. 30, 2012 for Chinese Patent Application No. 200680041246.7, with English Translation, 7 pages.

Chinese Office Action mailed Sep. 13, 2013 for Chinese Patent Application No. 200680041246.7, with English Translation, 14 pages.

Notice of Allowance issued on Jan. 8, 2013 for Japanese Patent Application No. 2008-530147, 4 pages.

Japanese Decision of Final Rejection mailed Jun. 12, 2012 for Japanese Patent Application No. 2008-530147, with English Translation, 7 pages.

Korean Notice of Non-Final Rejection mailed Mar. 29, 2013 for Korean Patent Application No. 10-2008-700819, with English Translation, 7 pages.

Korean Notice of Last Non-Final Rejection mailed Sep. 10, 2012 for Korean Patent Application No. 10-2008-700819, with English Translation, 5 pages.

* cited by examiner

SYSTEM AND METHOD FOR SECURED ACCOUNT NUMBERS IN PROXIMITY DEVICES

CROSS-REFERENCES TO RELATED APPLICATIONS

This application claims priority to U.S. Provisional Patent Application No. 60/714,635 filed Sep. 6, 2005, entitled "System And Method Using Ghost Account Number", which is hereby incorporated by reference in its entirety.

BACKGROUND OF THE INVENTION

The present invention relates in general to portable proximity consumer devices used in wireless payment transactions, and in particular to various embodiments of portable proximity consumer devices, such as credit and debit contactless smart cards, that use secured account numbers for wireless financial transactions.

Generally, portable proximity consumer devices such as contactless smart cards are designed to provide the consumer with a way to engage in purchase transactions by wirelessly connecting the portable proximity consumer devices directly with the merchant's point of sales device, for instance using radio frequency (RF) or infrared (IR) signals. For example, contactless smart cards allow a consumer to store and transmit financial data and other personal data to a merchant device which uses it to effect a payment during a purchase transaction.

Because portable proximity consumer devices operate without requiring direct connection to the accepting device, portable proximity consumer devices are expected to gain popularity over other types of devices that require physical contact and/or physical connections to communicate with other devices and systems. Illustratively, contactless smart cards may be used to replace regular credit cards, as they need not be in contact with a transaction terminal to be operated. Regular credit cards having magnetic stripes and contact smart cards must come in contact with a reader.

Portable proximity consumer devices may wirelessly exchange data with a proximity device reader from a distance, as long as the user is in wireless range of the proximity device reader. Unfortunately, due to the wireless nature of the portable proximity consumer devices, it is possible that proximity device reader may be used for surreptitious interrogation of the portable proximity consumer device by intercepting the portable proximity electronic device's communications. In addition, it is conceivable that a proximity accepting device may be developed or modified to enhance its power and sensitivity and thereby increase its ability to interrogate with and intercept signals from the portable proximity consumer devices from a greater distance than specified in standards used for portable proximity consumer devices.

Theft of sensitive information using wireless interrogation or interception of communications from portable proximity consumer devices is a major concern for consumers and businesses alike. Unfortunately, given the sophistication of the wireless interrogation equipment and the nature of wireless signals, it is easy for wireless interrogation to occur at virtually any time and place. Once the victim of the wireless interrogation discovers that they had sensitive information stolen, it is often too late to discover where the theft took place. The victim must then deal with the consequences and hassle of correcting the unauthorized access and possible uses of the information.

In response to such risk, many payment service providers have instigated safeguards for protecting purchases from fraudulent attacks, for example, by employing encryption technologies to encrypt the primary account number and other data associated with account transactions. Encryption generally involves encrypting transaction data on one end of a transmission with a key, and then regenerating the original transaction data by decrypting the encrypted data received with the same key on the other end of the transmission. While encryption technologies have proven to be highly effective in preventing information theft, implementing or upgrading to the latest encryption technology often requires upgrades by the end user's of payment processing systems. Due to the cost, time, and risk of potential business interruption (e.g., loss of sales), many merchants, for example, resist making necessary upgrades to their procedures and systems to implement such safeguards. Therefore, such safeguards have had limited success as they are generally expensive to implement, can be overcome, and have not been fully accepted by the credit card industry, merchants, payment processors, etc.

Therefore, what is needed is a cost effective device and method that integrates easily with exiting payment processing systems and prevents an unauthorized user from using data wirelessly interrogated or intercepted from a portable proximity consumer devices.

BRIEF SUMMARY OF THE INVENTION

Embodiments of the present invention provide an apparatus and method for conducting financial transactions using secured account numbers from portable proximity consumer devices.

Embodiments of the invention include the use of "secured account numbers". These may include "ghost" account numbers. A ghost account number can be one that is related to a person's real account number.

In one embodiment, the present invention provides a method including receiving an authorization request message which includes a secured account number. The secured account number is associated with a real account number. In this embodiment, the authorization request message originates from a transaction that results from a wireless based interaction between a portable proximity consumer devices including a wireless communication module and a memory pre-loaded with the secured account number and a proximity reader device including a second wireless communication module. The secured account number is wirelessly transmitted from the portable proximity consumer device to the proximity reader device. The secured account number may then be transmitted to a server computer operated by an acquirer, payment processing system, and/or issuer. After the secured account number is received by the server computer, the real account number is determined. Once the real account number is determined, the issuer, for example, may proceed with its usual transaction authorization methods and processes. The issuer may then send an authorization response message back to the proximity reader device to inform the consumer that the transaction is or is not authorized.

In another embodiment, the present invention provides a portable proximity consumer device for performing contactless transactions. The portable proximity consumer device includes a first antenna, a first memory including a secured account number coupled to the first antenna, and a second memory wherein the second memory comprising a real account number, wherein the real account number is associated with the secured account number.

In another embodiment, the present invention provides a system for performing payment transactions. The system includes a payment processing system capable of converting a secured account number to a user's real account number. In response to the payment processing system receiving a transaction authorization request comprising the secured account number, the payment processing system determines the user's real account number associated with the secured account number, and verifies that the transaction authorization request was associated with a wireless payment transaction.

These and other embodiments of the invention are described in further detail below.

DETAILED DESCRIPTION

Figure 1:
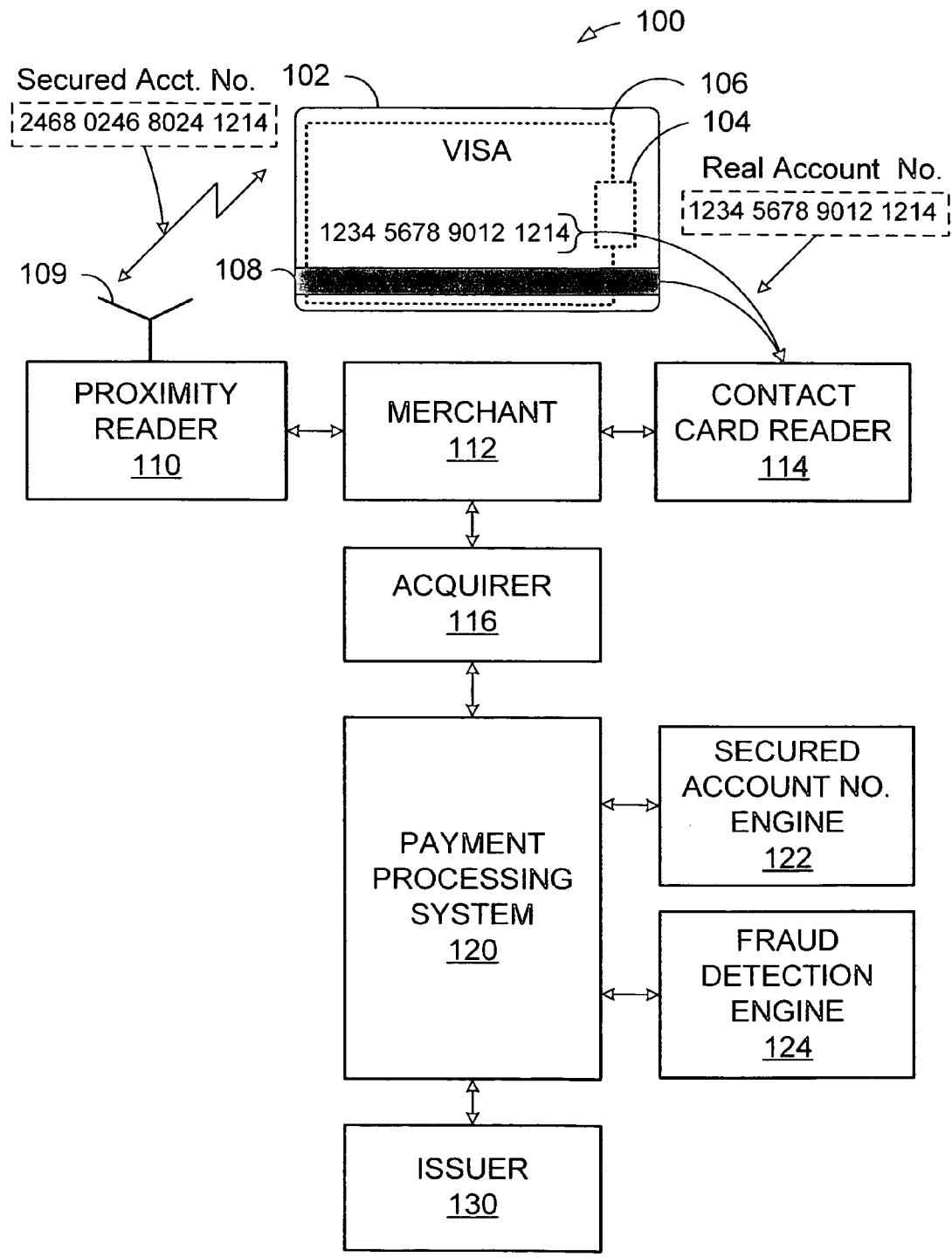
FIG. 1 is a high-level block diagram illustrating one embodiment of a transaction processing system in accordance with embodiments of the invention.

Embodiments of the invention are directed to the use of a secured account number preloaded onto a portable proximity consumer device. Portable proximity consumer devices may be any portable consumer device such as a contactless smart debit/credit card, contact chip enabled debit/credit card, a PDA, mobile phone, and the like, capable of wireless transmission of a secured account number, in lieu of a user's primary account number (PAN) or a user's real account number. As described herein, the term "proximate" may be used interchangeably with terms such as contactless relating to transactions wirelessly communicated between devices proximate to one another.

Secured account numbers may include "ghost" account numbers. In one embodiment, a ghost account number can be one that is related to a person's real account number. The secured account number may be considered an account number capable of resembling a user's real account number (e.g., a real PAN). For example, if a user's real account number contains nineteen digits, the secured account number may also contain nineteen digits. It is contemplated that the secured account number may be of any length as long as it resembles a real account number, such as a credit card number, debit card number, gift card number, and the like. For example, the secured account number may resemble a gift card number that is twenty one digits in length, when the user's real account number is nineteen digits long. The secured account number may also be a static number. The term "static" means that the secured account number does not have to change between transactions, but may change when the user changes accounts, the user's real account number expires, the portable proximity consumer device is lost or stolen, etc. The secured account number may also be described using terms such as bogus, fake, decoy, substitute, and the like, which signify an alphanumeric sequence that is used in place of a user's real account number to perform transactions.

In embodiments of the invention, the secured account number may be preloaded into a first memory in a portable proximity consumer device, while the user's real account number is stored in a second memory in the portable proximity consumer device. The first and second memories may use different data storage technologies. For example, the first memory may include a memory chip, and the second memory may be in the form of a magnetic stripe.

The portable proximity consumer device can operate in a variety of wireless transmission modes such as a contactless mode or an infrared mode, RF mode (i.e., Radio Frequency), and the like, and optionally may be operated in a contact mode such as through a hardwired communication interface. The secured account number is used in wireless transactions. The user's regular account number is used and transmitted when the portable proximity consumer device is used in a contact mode, or when the consumer performs a direct entry transaction (e.g., entering a real account number onto a Web form to purchase goods on the Internet).

Put another way, the secured account number is not used for contact transactions or direct entry transactions. For example, in a non-wireless transaction, when the secured account number is entered onto a Web form via an Internet merchant portal, the transaction will not be unauthorized. This is useful if someone (e.g., a thief) surreptitiously intercepts the secured account number during a contactless purchase transaction and obtains the secured account number. Because the secured account number is configured to resemble a real account number, it will deceive the unauthorized user into believing that it is an operable account number. However, if the unauthorized user enters the secured account number onto a Web form to conduct a transaction, the transaction is not authorized by the issuer, unless, for example, the issuer is using the transaction as a means to catch the unauthorized user. Furthermore, the secured account number is configured such that unauthorized users may not retrieve the real account number for use in fraudulent transactions, without access to a database configured to keep the real account number secret from unauthorized access. As will be explained in further detail below, this is advantageous as it can make it easier to detect an unauthorized transaction and discover potential fraud. In addition, the secured account number does not provide sufficient information to route the transaction to the appropriate issuer since the secured account does not provide a valid transaction path number (e.g., bank identification number). Thus, the present invention creates multiple challenges to prevent the transaction that the thief tries to conduct from being authorized.

The portable proximity consumer devices according to embodiments of the invention can be used with authorized wireless interrogation devices (e.g., authorized proximity reader devices) that can also have wireless communication and transmission modules (e.g., receiver, transceiver, etc.). Such authorized interrogation devices may be present at point-of-sale (POS) terminals, ATM (automatic teller machines), and the like. Such interrogation devices are well known in the art. The portable proximity consumer devices according to embodiments of the invention may operate with any number of such authorized wireless interrogation devices using a variety of operating standards. For example, such a standard may be the Europay-Mastercard-Visa (EMV) standard started by a working group created in 1993 by the world's three main payment organizations: EUROPAY (EPI), MASTERCARD (MCI) and VISA.

As noted above and below, an exemplary portable proximity consumer device may include a memory such as a memory chip and/or a microprocessor. Either may be operationally coupled to the communication and/or transmission modules in the portable proximity consumer device. The memory could be in the form of a memory chip or could be wired logic. The information in the memory may include information such as a user's bank account information, secured account number, credit or debit account number information, account balance information, consumer information, etc.

In some embodiments, during a process for authorizing an electronic payment transaction, the secured account number is wirelessly transmitted from a portable proximity consumer device to the proximity reader device performing the transaction, such as for instance, a contactless smart card transaction terminal. The secured account number is then transmitted from the contactless smart card transaction terminal at a merchant, to the merchant's acquirer, to a payment processing system, and then to the issuer. In one embodiment, one or more computational apparatuses at any one of these entities may be used to convert the secured account number into the user's real account number so that the issuer can respond to a submitted authorization request message.

In embodiments of the invention, an authorization request message for a transaction is created after a consumer purchases a good or service at a POS terminal using a portable proximity consumer device such as a credit or debit card. The authorization request message may be sent from the POS terminal located at a merchant to the merchant's acquirer, to a payment processing system, and then to an issuer.

A "merchant" in embodiments of the invention can have any suitable characteristics. A merchant may include entities such as corporations, sole proprietorships, non-profit organizations, or a specific group of such entities. Examples of merchants include restaurants, theaters, gasoline and fuel stores, grocery stores, clothing retailers, department stores, etc. The merchant has one or more POS terminals that can interact with the portable proximity consumer devices. Any suitable POS terminal may be used including card readers as described herein. The card readers may include any suitable contact or proximity mode of operation. For example, exemplary card readers can include RF (radio frequency) antennas, magnetic stripe readers, etc. to interact with the portable proximity consumer devices.

An "acquirer" is typically a business entity, e.g., a commercial bank that has a business relationship with a particular merchant. An "issuer" is typically a business entity (e.g., a bank) that issues a portable proximity consumer device such as a credit or debit card to a consumer. Some entities such as American Express perform both issuer and acquirer functions. Embodiments of the invention encompass such single entity issuer-acquirers.

An "authorization request message" can include a request for authorization to conduct an electronic payment transaction or some other type of activity. It may include one or more of an account holder's payment account number, currency code, sale amount, merchant transaction stamp, acceptor city, acceptor state/country, POS transaction number, POS transaction type, etc. Optionally, an authorization request message may be protected using a secure encryption method-e.g., 128-bit SSL or equivalent-in order to prevent data from being compromised. In other embodiments, an "authorization request message" may include a request for permission to enter a predetermined location (e.g., as used for wireless access badges).

Typically, an electronic payment transaction is authorized if the consumer conducting the transaction has sufficient funds or credit to conduct the transaction. Conversely, if there are insufficient funds or credit in the consumer's account, or if the consumer's portable proximity consumer device is on a blacklist (e.g., it is indicated as stolen), then an electronic payment transaction may not be authorized (e.g., declined).

FIG. 1 is a high-level block diagram illustrating one embodiment of a transaction processing system 100. The transaction processing system 100 includes a merchant 112, an acquirer 116, a payment processing system 120, and an account number issuer 130.

The transaction processing system 100 also includes a proximity reader device 110 capable of wirelessly receiving secured account numbers, and an optional contact reader 114, capable of receiving real account numbers from a portable proximity consumer device 102 such as a credit or debit smart card. The proximity reader device 110 and/or the contact reader 114 can be located at the merchant 112, or may be simply operated by the merchant 112.

The portable proximity consumer device 102 according to embodiments of the invention may be in any suitable form. For example, the portable proximity consumer device 102 can be hand-held and compact so that it can fit into a consumer's wallet and/or pocket (e.g., pocket-sized). For example, the portable proximity consumer device 102 may include smart cards, ordinary credit or debit cards (with a magnetic stripe and without a microprocessor), a keychain device, key Fob, etc. Other examples of contactless portable proximity consumer devices 102 include cellular phones, personal digital assistants (PDAs), pagers, payment cards, security cards, access cards, smart media, transponders, and the like. Such portable proximity consumer devices 102 can have one or more antennas 106 coupled to wireless transmission devices that can transmit and/or receive signals and data through a wireless communication medium.

The payment processing system 120 may include data processing subsystems, networks, and operations used to support and deliver authorization services, exception file services, and clearing and settlement services. An exemplary payment processing system 120 may include VisaNet™. Payment processing systems such as VisaNet™ are able to process credit card transactions, debit card transactions, and other types of commercial transactions. VisaNet™, in particular, includes a single message system (SMS) that automatically authorizes and provides enough information to automatically clear and settle a financial transaction, and/or a VIP system (Visa Integrated Payments system) which processes authorization requests and a Base II system, which performs clearing and settlement services.

The payment processing system 120 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. The payment processing system 120 may use any suitable wired or wireless network, including the Internet.

In one embodiment, the proximity reader device 110 is capable of wirelessly receiving a secured account number from a portable proximity consumer device 102. For example, as illustrated in FIG. 1, the secured account number "2468 0246 8024 1214" may be wirelessly transmitted from an antenna 106 of the portable proximity consumer device 102 to an antenna 109 coupled to a wireless transceiver of the proximity reader device 110 during a financial transaction by a consumer (e.g. user of a portable proximity consumer device). As described above, the contact reader 114 is capable of receiving a user's real account number from the portable proximity consumer device 102. For example, for a credit/debit smart card, the contact reader 114 is capable of retrieving information from a magnetic stripe, or by hand (e.g., by an operator of the contact reader 114). Illustratively, the contact reader 114 is capable of reading the user's real account number "1234 5678 9012 1214" from the magnetic stripe 108, and/or an operator may enter the user's real account number "1234 5678 9012 1214" into the contact reader 114 by hand.

The secured account number may be derived from the user's real account number using any suitable algorithm. For example, one exemplary algorithm multiplies the first twelve numbers of the user's real card number by two and then takes the last digit of the new number, e.g., 1234 5678 9012 1214, to convert the user's real account number to a secured account number, e.g. 2468 0246 8024 1214. In this example, the algorithm may leave a single digit in each digit location. As illustrated above, when the number five is multiplied by two, the algorithm drops the resultant one of the "10" to leave the zero. Of course, other algorithms may be used. Any such algorithms preferably leave the last four digits of the real account number unaltered. Typical credit card receipts mask the first series of numbers of a user's account number, but exposes the last four digits. By not altering the last four digits, the consumer does not know whether a secured account number or the real account number is used in a particular transaction. This is advantageous, as it avoids confusion on the part of the consumer and may deter fraudulent activities related to the retrieval of receipts.

The resultant secured account number may be stored in a database along with the real account number in a lookup table with other corresponding secured and real account numbers. The database may be accessible to the acquirer 116, payment processing system 120, and/or the issuer 130. The database is preferably accessible to at least one of the payment processing system 120 and/or the issuer 130, since the issuer 130 authorizes or does not authorize the user's transaction.

The secured account numbers may be preloaded into the user's portable proximity consumer device 102. The one or more algorithms may be used at any time, e.g., prior to manufacturing, during the manufacturing, or during processing of the consumer portable proximity device 102, to generate the secured account numbers. For example, the algorithm may be used when generating real account numbers, during production of the portable proximity consumer device 102, during account number activation, or when preparing to preload the secured account numbers into the portable proximity consumer devices 102, etc.

It is desirable to "preload" the secured account number into a memory in the portable proximity consumer device 102. As noted above, encryption techniques are known. However, such encryption techniques require the use of lengthy computer programs that need to be stored on the portable proximity consumer device. Such lengthy computer programs occupy valuable space in the memory of the portable proximity consumer device 102. By using a preloaded secured account number that resembles a real account number, a relatively small amount of space is used in the memory of the portable proximity consumer device 102. Additionally, the software and the hardware associated with the proximity reader device 110 and/or the contact card reader 114 need not be altered since the secured account number has the same form as the real account number.

In one operational embodiment, during a consumer purchase transaction, an authorization request message including a secured account number is wirelessly transmitted from the portable proximity consumer device 102 to the proximity reader device 110. For example, a consumer can purchase an article of clothing with a contactless smart card. The authorization request message including the secured account number and a POS transaction type identifier (indicative that the transaction was a wireless type of proximity transaction,) is received by the merchant 112 and is transmitted to the acquirer 116. The acquirer 116 then transmits, among other information, the authorization request message including the secured account number, POS transaction type identifier to the payment processing system 120 for processing thereof.

In one embodiment, the POS transaction type identifier may be an alphanumeric indicator, symbol, and the like. It may indicate that transaction that was conducted was a proximity financial transaction, and was not a contact-type transaction. For example, the POS transaction type identifier may be a conventional number used in the credit card industry such as "POS entry code 91", or could be a modified version of a standard indicator such as a modified international standards organization (ISO) indicator. After a server computer at the payment processing system 120 receives the authorization request message, the payment processing system 120 identifies the transmitted account number as a secured account number and uses the POS transaction type identifier to identify the transaction as a wireless transaction. If the secured account number is valid and if the transaction is identified as a wireless transaction, then the payment processing system 120 converts the secured account number to the user's real account number. The real account number is then transmitted to the issuer 130 for payment authorization.

The real account number includes the real account number's BIN (bank identification number) so the transaction processing system 120 knows which particular issuer is supposed to receive the authorization request message. Generally, a BIN corresponds to the first six digits of the user's real account number (e.g., a credit or debit account number). These first six digits identify which network the portable proximity consumer device 102 is associated with as well as which issuer 130 issued the portable proximity consumer device 102. If the transaction is authorized by the issuer 130, the payment processing system 120 transmits an authorization response message along with the secured account number (or real account number) back to the acquirer 116. The acquirer 116 sends the authorization response message to the merchant 112. A printer (not shown) at the merchant 112 may then print a receipt showing only the last four digits of the secured account number, e.g., ***********1214. As noted above, since the last four digits are the same for both the secured account number and the user's real account number, the user is unaware of any account number differences between the secured account number and the user's real account number. While four digits are illustrated, one skilled in the art will recognize that any alphanumeric indicator, symbol, or indicia, common to both the secured account number and the user's real account number may be used within the scope of the present invention. For example, in some embodiments, the secured account number and the real account number may have two or more common numbers.

Two software engines are illustrated in FIG. 1. They include a secured account engine 122 and an optional fraud detection engine 124. Various other software engines may also be included in the system to perform the methods according to embodiments of the invention. Although the two software engines 122, 124 are shown as being directly accessible to the payment processing system 120, they may also or alternatively be directly accessible to the proximity reader device 110, the merchant 112, the acquirer 116, and the issuer 130. The secured account engine 122 is preferably directly accessible or within the payment processing system 120. If the secured account number is converted at the payment processing system 120, the payment processing system 120 will be able to route the authorization request message to the appropriate issuer 130. In addition, if the software for converting the secured account number into the real account number is at the payment processing system 120, expensive equipment upgrades need not occur at the acquirer 116 or merchant 112.

When a secured account number is received by the secured account engine 122, the secured account engine 122 converts the secured account number to the user's real account number. In one embodiment, the secured account engine 122 compares the secured account number to a plurality of secured account numbers to find the user's real account number (e.g., in a lookup table). Alternatively, one or more algorithms may be operated to convert the secured account number to the user's real account number. A suitable algorithm may be the reverse program of the algorithm used to convert the real account number to the secured account number (as described above).

If the payment processing system 120 receives an authorization request message including a secured account number that does not have the transaction type identifier (e.g., POS 91), or other indicator, indicating a proximity transaction, then the optional fraud detection engine 124 may be capable of one or more proactive and non-proactive responses. For example, one non-proactive response is simply to deny the transaction. An authorization response message may be sent from the issuer 130 to the merchant 112 that indicates that the transaction is not authorized. One example of a proactive response is to alert legal authorities that a fraudulent activity is taking place. In one embodiment, when the secured account number is received by the payment processing system 120 without the POS proximity transaction indicator, then the issuer 130 is notified. The issuer 130 checks the user's real account for unusual activity (e.g., large purchases when a consumer usually does not make large purchases). If unusual activity is detected, then the payment processing system 120 and/or the issuer 130 may suspend the secured account number until verification is made that the secured account number was not stolen. In this case, the use of the secured account number and/or the real account number can be temporarily suspended pending an investigation. If it is determined that the user's secured account number was obtained and used by an unauthorized person, then the payment processing system 120 may reissue a new portable proximity consumer device to the real user. For example, similar to conventional procedures for lost or stolen account numbers, part of the verification process may be for the payment processing system 120 to issue an alert to the merchant 112 to keep the portable proximity consumer device 102, or to have the user contact the issuer 130 to verify the unauthorized transaction.

Figure 2:
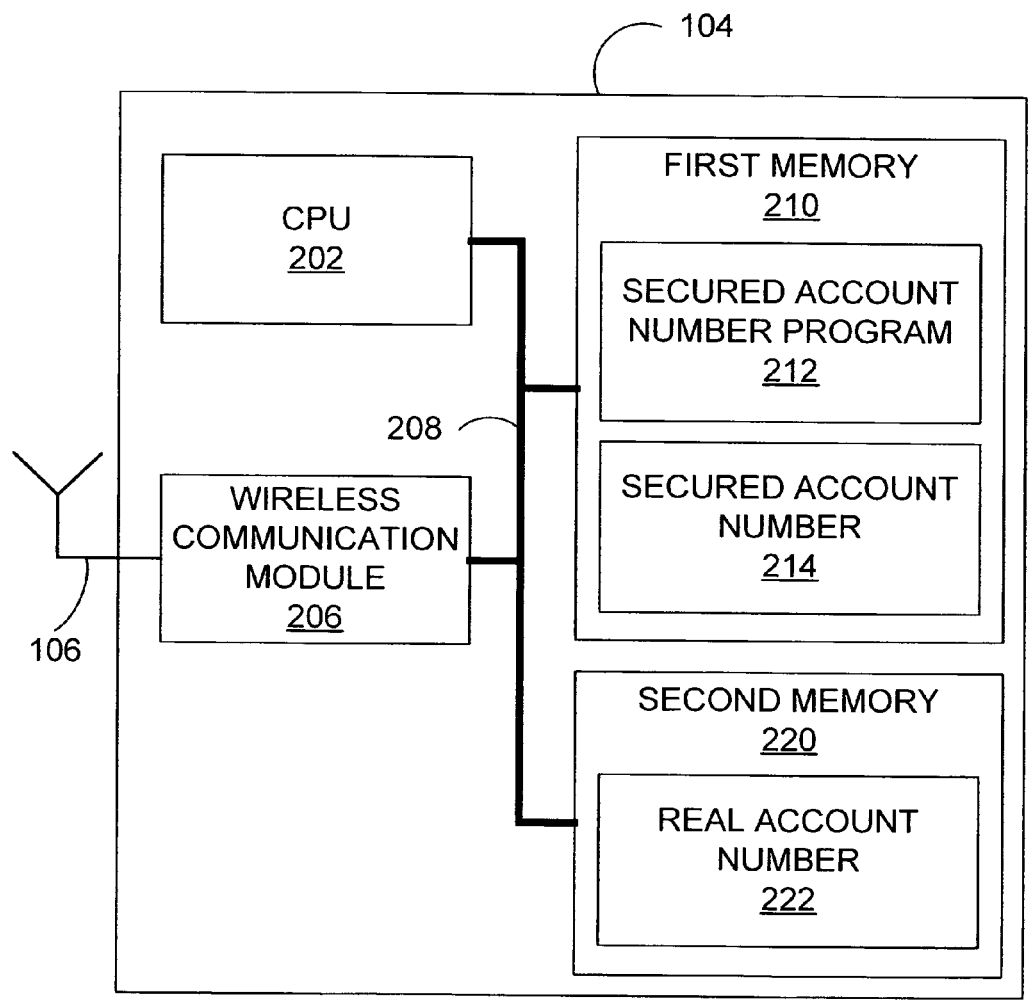
FIG. 2 is a high-level block diagram illustrating one embodiment of a data processing circuit for a portable proximity consumer device in accordance with embodiments of the invention.

FIG. 2 is a high-level block diagram illustrating one embodiment of a data processing circuit 104 for use with a portable proximity consumer device 102. The data processing circuit 104 may be virtually any type of integrated circuit and/or data processing system such as a microprocessor, field programmable gate array (FPGA), application specific integrated circuit (ASIC), and the like, that may be configured to perform embodiments of the present invention to advantage. In one embodiment, data processing circuit 104 includes a Central Processing Unit (CPU) 202, a wireless communication module or transceiver circuit 206, and a first memory 210, and an optional second memory 220 in communication therewith via a bus 208. CPU 202 may be under the control of an operating system that may be disposed in first memory 210. Virtually any operating system or portion thereof supporting the configuration functions disclosed herein may be used. In one embodiment, CPU 202 may be hardwired logic circuitry, and the like, adapted to operate data processing circuit 104.

The wireless communication module 206 may be designed to receive wireless interrogation signals and transmit communication signals to the proximity reader device 110 via the wireless transmission module 106. Any number of wireless communication devices well known in the art may be used to accomplish the reception and transmission of data between the proximity reader device 110 and the portable proximity consumer device 102. For example, the wireless communication module 206 may be formed from a wireless receiver in combination with a wireless transmitter. The wireless communication module 206 may use any viable communication link such as ISO 14443, Bluetooth, 802.11x, cellular network, RF, and the like. In other words, virtually any wireless transceiver system that is sized accordingly and capable of communicating with contactless reader 110 may be used.

The first memory 210 can be a non-volatile or volatile memory such as a random access memory that has sufficient space to hold the necessary programming and data structures of the invention. While first memory 210 is shown as a single entity, it should be understood that first memory 210 may in fact comprise a plurality of modules, and that first memory 210 may exist at multiple levels, from high speed registers and caches to lower speed but larger direct random access memory (DRAM) chips. In one embodiment, first memory 210 may include a secured account program 212 and secured account number storage 214. The secured account program 212 may use any one of a number of different programming languages. For example, the program code can be written in PLC code (e.g., ladder logic), a higher-level language such as C, C++, Java, or a number of other languages. While secured account program 212 may be a standalone program, it is contemplated that secured account program 212 may be combined with other programs.

The secured account program 212 when executed on CPU 202, provides a secured account number to the proximity reader device 110 from the secured account number storage 214. In one embodiment, the secured account program 212 is configured to retrieve a secured account number from the secured account storage 214. The secured account program 212 instructs the CPU 202 to wirelessly transmit the secured account number, among other data such as available credit, user data, and the like, to the proximity reader device 110 via the wireless communication module 206.

In one embodiment, data processing circuit 104 may optionally include a second memory 220. The second memory 220 is capable of storing the user's real account number in a real account number storage 222. Preferably, in the case were data processing circuit 104 stores both the secured account number and the user's real account number, the user's real account number is accessible only via a physical contact connection. For example, the user's real account number may be accessed via an electrical connection with data processing circuit 104. In an alternate embodiment, similar to conventional credit/debit cards the user's real account number may be encoded onto the magnetic stripe 108. In this configuration, the user's real account number is accessible using conventional contact readers 114 capable of reading magnetic stripes.

In preferred embodiments, the first and second memories use different data storage technologies. For example, the first and second memories may be selected from optical, magnetic, or electronic storage media, and may be different. For example, the first memory may be use an electronic storage medium (e.g., a memory chip), while the second memory may use a magnetic storage medium (e.g., a magnetic stripe 108).

Figure 3:
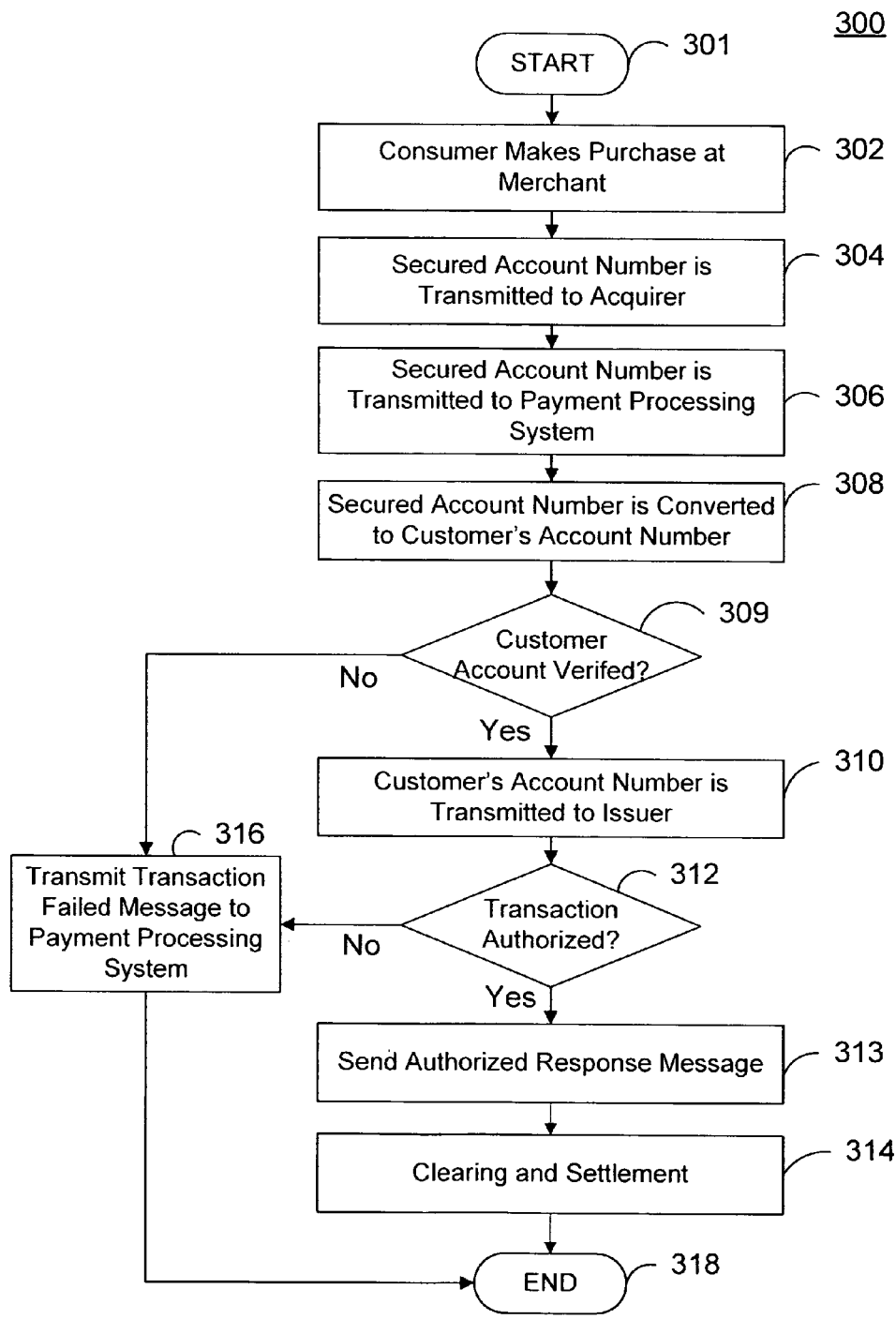
FIG. 3 is a high-level flow diagram illustrating one embodiment of a method of performing a secured account number transaction process in accordance with embodiments of the invention.

FIG. 3 is a high-level flow diagram illustrating one embodiment of a method 300 of performing a secured account number transaction process. The method 300 may be entered into at step 301 when, for example, a proximity reader device 110 wirelessly interrogates a portable proximity consumer device 102. At step 302, a user initiates the creation of an authorization request message to, for example, purchase goods or services from a merchant 112 (e.g., the user is attempting to purchase a piece of clothing using the portable proximity consumer device 102), by passing the portable proximity consumer device 102 close to the proximity reader device 110. The proximity reader device 110 wirelessly interrogates the portable proximity consumer device 102. At step 304, the portable proximity consumer device 102 responds to valid interrogation protocols (e.g., fetch account number instructions, fetch user ID instructions, etc.) by wirelessly transmitting information to the proximity reader device 110. The information may include a secured account number along with other data, such as an expiration date of the user's account. The proximity reader device 110 then creates an authorization request message including the secured account number, merchant ID, POS transaction type identifier, and the purchase amount, and it is transmitted from the merchant 112 to the acquirer 116 at step 304. For example, the merchant 112 may transmit the secured account number, the merchant ID, the POS transaction type, the user's identification, the expiration date, and the like to the acquirer 116. At step 306, the acquirer 116 transmits the information received from the acquirer 116 to the payment processing system 120.

At step 308, the secured account number is converted to the user's real account number. For example, as described above, when a secured account number is received by the payment processing system 120, a secured account engine 122 converts the secured account number to the user's real account number. In one embodiment, the secured account engine 122 may search a database of secured account numbers to find the user's real account number. Alternatively, a conversion algorithm may be used to convert the secured account number to the user's real account number.

If the real account number is not found, at step 309, the method 300 proceeds to step 316 and, for example, issues a transaction invalid protocol to the payment processing system 120. For example, if the real account number is not found, the payment processing system 120 may alert the issuer 130, the acquirer 116, and/or the merchant 112 that the transaction is not authorized. Conceivably, after attempting to use the contactless authorization, the user, being unaware of the secured account number, may reattempt the transaction using the user's real account number via entry by an operator or by using a contact reader 114.

At step 310, if the secured account number is valid, the authorization request message including the user's real account number, the merchant ID, the POS transaction type, and the purchase amount along with other transaction data to the issuer 130. For example, the payment processing system 120 may transmit the user's real account number, the secured account number, and the POS transaction type, along with other transaction data to the issuer 130. At step 312 if the transaction is not authorized, e.g. the user does not have sufficient credit for the purchase, the method 300 proceeds to step 316. However, if the transaction is authorized, e.g., the issuer 130 has authorized the transaction, the method 300 proceeds to step 313. Then at step 313, an authorization response message is sent to the merchant 112 informing the merchant 112 and the user whether or not the transaction is authorized. At step 314, the transaction is cleared and settled using conventional procedures. For example, at the end of the day, a normal clearing and settlement process can take place at step 314. At step 318 the method 300 ends.

Figure 4:
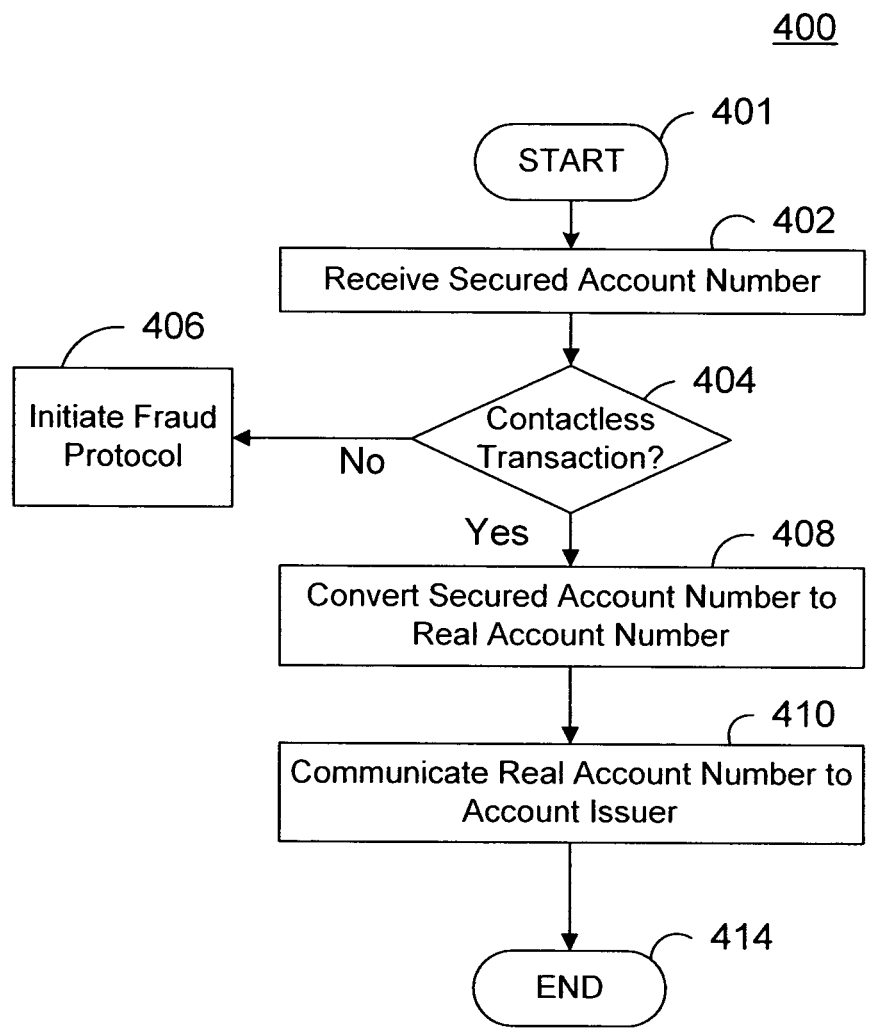
FIG. 4 is a high-level flow diagram illustrating one embodiment of a method of performing a transaction process involving a wireless based transmission of a secured account number from a portable proximity consumer device to a proximity device reader in accordance with embodiments of the invention.

FIG. 4 is a high-level flow diagram illustrating one embodiment of a method 400 of performing a financial transaction involving a secured account number. The method 400 may be entered into at step 401 when, for example, when a merchant 112 transmits a purchase authorization request to a payment processing system 120. At step 402, a secured account number is received. For example, a payment processing system 120 receives a secured account number and POS transaction type from an acquirer 116. At step 404, the method 400 determines if the secured account number was received from a portable proximity consumer device 102 wirelessly communicating with a proximity reader device 110. In one embodiment, the method 400 uses a POS transaction type identifier to determine if the secured account number was received either using a proximity transaction, or was received via another means, such as an Internet merchant portal, or by hand entry into terminal of a proximity reader device 110 or a contact reader 114, and the like. If the secured account number was not received via a proximity reader device 110, then the method 400 proceeds to step 406 and initiates a fraud protocol. For example, the fraud protocol may be used for tracking the transaction by authorities, instructing the payment processing system 120 to deny the transaction, and/or sending a status report to the issuer indicative of the fact that the secured account number has been acquired by unauthorized users. If at step 404 the method 400 determines that the secured account number and the POS transaction type are correct, the method 400 proceeds to step 408. The method 400 converts the secured account number to the user's real account number at step 408. For example, the payment processing system 120 may perform algorithms to convert the secured account number to the user's real account number some of which are described herein. At step 410 the user's real account number and other verification data such as expiration date and customer identification are transmitted to an issuer 130 for authorization. Optionally, at step 410 the secured account number is also transmitted to the issuer 130. The method 400 ends at step 414.

The method shown in FIG. 4 may be combined with any of the steps in the method shown in FIG. 3. The method may also be conducted by the secured account engine 122, the payment processing system 120, or any other suitable entity.

Any of the above described steps may be embodied as computer code on a computer readable medium. The computer readable medium may reside on one or more computational apparatuses and may use any suitable data storage technology.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
    receiving an authorization request message by a server computer associated with a payment processing network, wherein the authorization request message includes a secured account number, wherein the authorization request message originated from a wireless interaction, the interaction between:
        a portable proximity consumer device in the form of a card including a first memory pre-loaded with the secured account number, a real account number stored in a second memory, a wireless transmission module, wherein the storage technology of the first memory differs from the storage technology of the second memory; and
        a proximity reader device comprising a second wireless transmission module,
    wherein the secured account number is associated with the real account number, and wherein the secured account number was wirelessly transmitted from the first wireless transmission module in the portable proximity consumer device to the second wireless transmission module in the proximity reader device;
    determining by the server computer the real account number using the secured account number after receiving the authorization request message including the secured account number; and
    routing by the server computer the authorization request message to an issuer.

2. The method of 1, wherein the secured account number is only wirelessly transmitted to the proximity reader device when there is a wireless financial transaction and wherein the real account number is used for non-wireless financial transactions.

3. The method of claim 1, further comprising sending an authorization response message after the real account number is determined using the secured account number.

4. The method of claim 1, wherein the real account number is a user's credit card account number, bank account number, or debit card account number.

5. The method of claim 1, wherein the authorization request message comprises a wireless transaction type identifier.

6. The method of claim 1, further wherein the authorization request message was previously encrypted.

7. The method of claim 1, wherein the portable proximity consumer device is in the form of a card, and wherein the second memory is in the form of a magnetic stripe comprising the real account number.

8. The method of claim 1, further comprising pre-loading the secured account number into the first memory and pre-loading the real account number into the second memory.

9. The method of claim 1, wherein the wireless transmission module and the second wireless transmission module operate according to the Europay-Mastercard-Visa standard.

10. A method of conducting wireless financial transactions, the method comprising:
    receiving an authorization request message by a server computer associated with a payment processing network, the authorization request message including a static secured account number and a transaction identifier, wherein the static secured account number does not change between transactions, and wherein the authorization request message originated from a portable consumer device comprising the secured account number stored in a first memory and a real account number stored in a second memory, wherein the storage technology of the first memory differs from the storage technology of the second memory;
    determining by the server computer the real account number using the secured account number when the transaction identifier is indicative that the secured account number originated from a wireless transaction with the portable consumer device; and
    routing by the server computer the authorization request message to an issuer.

11. The method of claim 10, wherein the real account number is usable for non-wireless financial transactions.

12. The method of claim 10, further comprising generating an alert when the transaction identifier is indicative that the secured account number originated from a non-wireless transaction.

13. The method of claim 10, further comprising:
    generating an alphanumeric output that includes a predetermined sequence of alphanumeric characters designated to be common to both the secured account number and the real account number; and
    masking or eliminating other alphanumeric characters of the alphanumeric output not designated the predetermined sequence.

14. The method of claim 10, wherein receiving an authorization request message comprises;
    transmitting the authorization request message to an acquirer;
    transmitting the authorization request message from the acquirer to a payment processing system;
    verifying with the payment processing system that the secured account number is associated with a wireless transaction;
    when verified that the secured account number is associated with the wireless transaction, sending the authorization request message along with the real account number to an issuer for authorization; and
    when the financial transaction is authorized, transmitting an authorization message from the issuer to the payment processing system, acquirer, and merchant.

15. The method of claim 10, wherein determining the real account number comprises querying a database of secured account numbers, wherein each of the secured account numbers is associated with a respective real account number.

16. The method of claim 10, wherein determining the real account number comprises processing the secured account number with an algorithm configured to convert the secured account number to the real account number.

* * * * *